(12) United States Patent
Poth et al.

(10) Patent No.: US 9,330,377 B2
(45) Date of Patent: May 3, 2016

(54) SYSTEM AND METHOD OF UPDATING RELATED DOCUMENTS

(75) Inventors: Andreas Poth, Weingarten (DE); Iris Zimmermann, Heidelberg (DE)

(73) Assignee: SAP SE, Waldorf (DE)

(*) Notice: Subject to any disclaimer, the term of this patent is extended or adjusted under 35 U.S.C. 154(b) by 357 days.

(21) Appl. No.: 12/982,065

(22) Filed: Dec. 30, 2010

(65) Prior Publication Data

US 2012/0173481 A1 Jul. 5, 2012

(51) Int. Cl.
*G06F 3/048* (2013.01)
*G06Q 10/10* (2012.01)

(52) U.S. Cl.
CPC .................................... *G06Q 10/10* (2013.01)

(58) Field of Classification Search
CPC ...................................................... G06Q 10/10
See application file for complete search history.

(56) References Cited

U.S. PATENT DOCUMENTS

| | | | |
|---|---|---|---|
| 2002/0116399 A1* | 8/2002 | Camps et al. | 707/200 |
| 2004/0205656 A1* | 10/2004 | Reulein et al. | 715/530 |
| 2006/0235732 A1* | 10/2006 | Miller et al. | 705/7 |
| 2009/0043824 A1* | 2/2009 | Claghorn | 707/200 |
| 2009/0144721 A1 | 6/2009 | Wagner et al. | 717/172 |
| 2009/0216613 A1 | 8/2009 | Steinbach et al. | 705/10 |
| 2009/0216614 A1 | 8/2009 | Steinbach et al. | 705/10 |
| 2009/0216615 A1 | 8/2009 | Poth et al. | 705/10 |
| 2010/0070324 A1 | 3/2010 | Bock et al. | 705/8 |
| 2010/0070753 A1* | 3/2010 | Kido et al. | 713/150 |
| 2010/0138258 A1 | 6/2010 | Steinbach et al. | 705/7 |
| 2010/0153167 A1* | 6/2010 | Kretzschmar et al. | 705/9 |

* cited by examiner

*Primary Examiner* — Tarek Chbouki
(74) *Attorney, Agent, or Firm* — Fish & Richardson P.C.

(57) ABSTRACT

The present disclosure is directed to updating related documents. In some implementations, a method includes receiving a notification of an intention to update to a predecessor document in a business process prior to receiving a specific update to the predecessor document. In response to at least the potential-update notification, a successor document in the business process is identified. The successor document depends on information identified by the predecessor document. Release of the successor document is substantially prevented in connection with the notification of the intent to update to the predecessor document.

21 Claims, 4 Drawing Sheets

SYSTEM AND METHOD OF UPDATING RELATED DOCUMENTS

TECHNICAL FIELD

This disclosure relates to business processes and, more particularly, a system and method of updating related documents.

BACKGROUND

A business process can include multiple aspects managed by different enterprises. The different enterprises can generate different documents for the corresponding business aspect of the business process. In business processes that include multiple interdependent documents, some business enterprises can generate successor documents after receiving predecessor documents from a different enterprise. The different enterprises can represent the predecessor and successor business documents using Business Objects (BOs). Changes to a predecessor document and a corresponding predecessor BO in a business process can require changes to successor documents and the associated successor BO. In these instances, at least one of the following may occur a change may not be performed in the predecessor document if a successor document has already been created or a change is allowed in the predecessor document but does not have an impact on the successor documents.

SUMMARY

The present disclosure is directed to updating related documents. In some implementations, a method includes receiving a notification of an intention to update to a predecessor document in a business process prior to receiving a specific update to the predecessor document. In response to at least the potential-update notification, a successor document in the business process is identified. The successor document depends on information identified by the predecessor document. Release of the successor document is substantially prevented in connection with the notification of the intent to update to the predecessor document.

The details of some implementations are set forth in the accompanying drawings and the description below. Other features, objects, and advantages of the implementations will be apparent from the description and drawings, and from the claims.

DESCRIPTION OF DRAWINGS

Like reference symbols in the various drawings indicate like elements.

DETAILED DESCRIPTION

Figure 1:
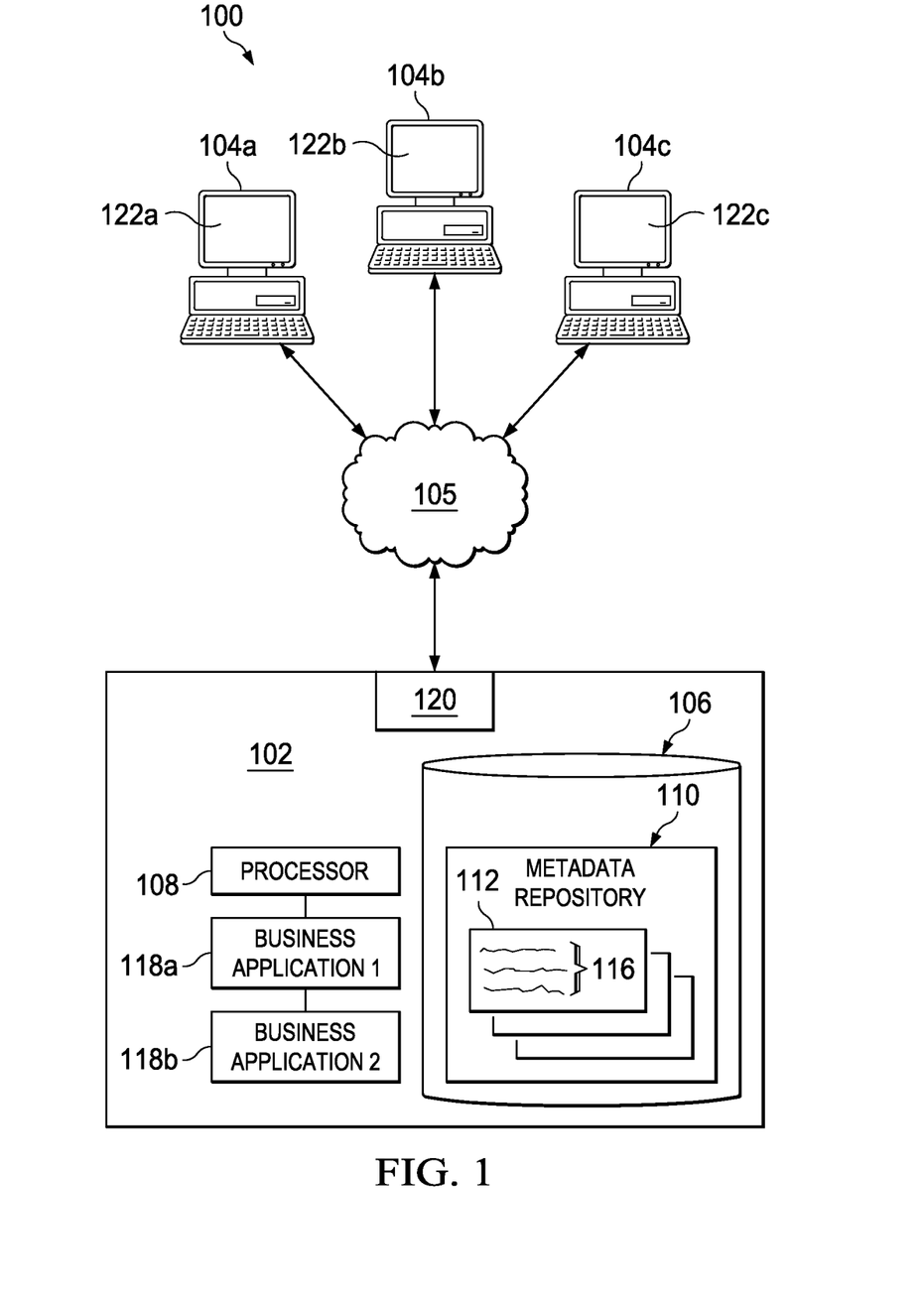
FIG. 1 is a system for executing a business process including a plurality of different documents.

FIG. 1 illustrates a process system 100 for executing a business process including a plurality of different documents. For example, the system 100 may execute a business process including at least a successor document dependent on a predecessor document and automatically preventing release of the successor document in response to at least a notification of an intention to update the predecessor document. In some implementations, a business process can include a plurality of interdependent documents associated with different stages in the business process. For example, the business aspects may include a sales order, an outbound delivery, a customer invoice and an export declaration. In these instances, the outbound delivery, the customer invoice and the export declaration may at least depend on the sales order. In response to receiving an indication of an intention to update to a predecessor document, the system 100 may automatically execute a hold on or otherwise prevent release of at least one successor document. An indication may include a user selecting an application that edits the predecessor document, a user request to a business application to update a business document, and/or other user actions that indicate a user is intending to update a document. As previously described, the system 100 may identify the intention prior to receiving a specific update to the identified document. By substantially preventing finalization or otherwise release of the successor document before receiving an actual update, the system 100 may eliminate, minimize or otherwise reduce errors associated with a business process including interdependent documents. To execute a hold or substantially prevent release of a dependent document, the system 100 may include an attribute or variable in a business object that identifies whether updated information is expected, received and/or finalized. In other words, the system 100 may hold, prevent finalization or otherwise substantially prevent release of a dependent document. Substantially prevent release of a document may include preventing release or releasing a portion of the document while preventing release of the remainder. For example, the system 100 may include a status variable for at least one business objects that indicate that an update request has been completed, expected, received, partially received, and/or other status. By including a value identifying an expected update, the system 100 may automatically identify documents in the business process based on a predecessor document that a user has selected to update or otherwise indicated an intention to update. In other words, the system 100 may anticipate or otherwise forecast updates to predecessor documents. By anticipating updates to predecessor documents, the system 100 may substantially prevent users from working with invalid data or data which may become outdated in the near future. In response to receiving the anticipated update, the system 100 may present the received update and request user interaction. In other words, the system 100 may transparently present a notification of an expected update, the received update, and/or the request for user interaction to accept or reject the update to the successor documents.

At a high level, the system 100 includes a server 102 communicably coupled to a plurality of clients 104a-c through a network 105. The client 104 is an electronic device that is owned, operated or otherwise associated with a user and operable to at least receive access to services from the server 102. The server 102 is an electronic device operable to process service request, process business objects in response to service requests, generate interrelated business documents for a business process, and execute a hold on a successor document in response to at least a user intention to update a predecessor document. The server 102 includes memory 106 and a processor 108. The memory 106 includes a metadata repository 110 for identifying metadata as well as business objects 112. In the illustrated implementation, the business object 112 includes a status variable 116 indicating whether a specific update to the predecessor document is expected, received, completed, and/or other status. The processor 108 executes business applications 118a and 118b, and the business applications 118 generate business objects representing corresponding business documents and execute holds on successor documents based, at least in part, on notifications of potential updates to at least one business object 112. At a high level of operation, the business application 118a may receive a request to edit a predecessor document from a user of server 102 or client 104. In response to the update request, the business application 118a may identify the associated business object 112 and business objects 112 associated with successor documents. In addition, the business application 118a may update the status variable 116 of the business objects 112 associated with the successor document to indicate an expectation that updated information will be received. In connection with updating the variable 116, the business application 118b may substantially prevent users and/or applications 118 from finalizing or otherwise releasing the successor document based on the value of the status variable 116. After receiving the updated information and/or associated user interaction, the business application 118b may modify the successor document in accordance with the update. In some instances, the business application 118b may remove the hold and release the successor document without modification in response to at least a user interaction. In addition, the business application 118b may update the status variable 116 to indicate that the update to the successor document has been completed.

Turning to the illustrated implementation, system 100 may be a distributed client/server system that allows clients 104 to submit requests to store and/or retrieve information from metadata repository 110 maintained within memory 106 on server 102. But system 100 may also be a standalone computing environment or any other suitable environment, such as an administrator accessing data stored on server 102, without departing from the scope of this disclosure. System 100 may allow access to individual business objects 112 within the metadata repository 110 using access methods such as Java, COM/DCOM (Component Object Model/Distributed Component Object Model), CORBA (Common Object Request Broker Architecture), RFC (Remote Function Call), and Hypertext Transfer Protocol (HTTP), or other suitable access methods.

As for a more detailed description of the illustrated implementation, the server 102 includes memory 106 and processor 108 and comprises an electronic computing device operable to receive, transmit, process and store data associated with system 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel or Linux/390, UNIX, Windows Server, or any other suitable operating system. According to one implementation, server 102 may also include or be communicably coupled with a web server and/or an SMTP server.

Memory 106 may include any memory or database module and may take the form of volatile or non-volatile memory including, without limitation, magnetic media, optical media, random access memory (RAM), read-only memory (ROM), removable media, or any other suitable local or remote memory component. In this implementation, illustrated memory 106 includes metadata repository 110. In some implementations, the metadata repository 110 may be stored in at least one table in a relational database described in terms of SQL statements or scripts. In the same or other implementations, the metadata repository 110 may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or at least one library. In short, the metadata repository 110 may comprise one table or file or a plurality of tables or files stored on one computer or across a plurality of computers in any appropriate format. Indeed, some or the entire metadata repository 110 may be local or remote without departing from the scope of this disclosure and store any type of appropriate data. In particular implementations, the metadata repository 110 may access the business objects 112 in response to queries from clients 104.

These business objects 112 may represent organized data relating to some project or endeavor, which may or may not be linked, with each object having at least one states related to the object. Each of the states, in turn, may be associated with data that pertains to various modifiable parameters of the individual states of the object. One type of data modeling that includes multiple objects with each having multiple states, and each state having multiple instances of changes to the state's modifiable parameters is the business object model. The overall structure of a business object model ensures the consistency of the interfaces that are derived from the business object model. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some implementations, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

In the illustrated implementation, the business object 110 includes a variable 116 identifying a status of an expected update to a predecessor document. For example, the variable 116 may indicate that an update to an associated business document is expected and/or partially received. In some implementations, the variable 116 may indicate, from a Business Object's point of view, expected or already received updated information in the business process. These status variables 116 may increase transparency to the user regarding the activities in the system 100 of business documents and/or enable the user to assess the current overall status of the business process. Based on the increased transparency in the document system, the status variable 116 may enable the user to review the information in the predecessor document before the user approves corresponding updates of dependent attributes within the dependent successor documents and their associated business objects 112. In some implementations, the user may decide to discard and/or handle the new updated information differently. In general, the status variable 116 may describe or otherwise identify the different possible updates and/or update requests requested within the business process. In these instances, each status variable 116 for the different successor business objects 112 may describe a different aspect of a business process. The various aspects may be defined by or otherwise dependent on another business object 112, a part of business object 112 or a set of business documents 112 within the business process. In other words, each variable 116, while related to other variables 116 in different objects 112, may identify different aspects in the business process. For example, a variable 116 within an export declaration may describe update requests due to changes of: the outbound delivery; the customer invoice; packaging information from within the outbound delivery; the sales process reflected in multiple business documents as the sales order and customer invoice; and/or others. In this example and/or others, values for the variable 116 may include completed, expected, received, partially received, and/or other status. Using these values in the export declaration example, the export declaration may have been generated based on the latest state of the outbound delivery and after the release of the outbound delivery. With respect to the outbound delivery, all update requests may be processed completely, and the variable 116 may be updated to indicate that no further update requests are expected (e.g., variable outbound delivery: completed). In the case that the customer invoice request has not been released, the variable 116 may indicate that an update request from the customer invoice is expected (e.g., variable customer invoice: expected). If an update request from the customer invoice has been received, the variable 116 may indicated that a user assess the request and decide on the further processing before release (e.g., variable customer invoice: received).

Server 102 also includes processor 108. Processor 108 executes instructions and manipulates data to perform the operations of server 102 such as, for example, a central processing unit (CPU), a blade, an application specific integrated circuit (ASIC), or a field-programmable gate array (FPGA). In particular, processor 108 performs any suitable tasks associated with metadata repository 110. Although FIG. 1 illustrates a single processor 108 in server 102, multiple processors 108 may be used according to particular needs and reference to processor 108 is meant to include multiple processors 108 where applicable.

Server 102 may also include interface 120 for communicating with other computer systems, such as client 104, over network 105 in a client-server or other distributed environment. In certain implementations, server 102 receives requests for data access from local or remote senders through interface 120 for storage in memory 106 and/or processing by processor 108. Generally, interface 120 comprises logic encoded in software and/or hardware in a suitable combination and operable to communicate with network 105. More specifically, interface 120 may comprise software supporting at least one communications protocols associated with communications network 105 or hardware operable to communicate physical signals.

Figure 2:
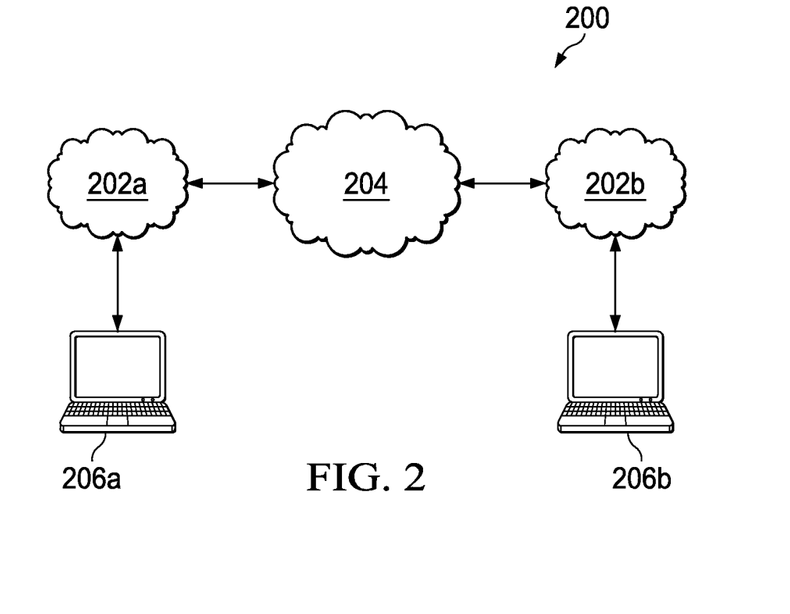
FIG. 2 is system for transmitting indications of an update between different enterprises.

Server 102 may also include or reference local, distributed, or hosted business applications 118a and 118b. In some implementations, the business applications 118a and 118b may be associated with different aspects of a business process. For example, the business application 118a may be associated with receiving orders from customers through network 105, and the business application 118b may be associated with generating invoices for orders. In these instances, the business application 118 may be associated with interdependent business documents or interdependent business objects 112. In the example, the business application 118b may be associated with an invoice that depends on a purchase order generated by the business application 118a. Depends may include using information from the purchase order, using information derived by information included in the purchase order, using information identified by the purchase order, or otherwise associated. While the business applications 118 are in a single server 102, the business applications 118 may reside in different servers and/or different enterprises as illustrated in FIG. 2. For example, application 118a may be managed by an online retailer while application 118b may be operated by a delivery service.

At a high level, business application 118 is any application, program, module, process, or other software that may access, retrieve, modify, delete, or otherwise manage some information stored in or otherwise identified by the metadata repository 110. Specifically, business application 118 may access the metadata repository 110 to retrieve or modify data stored within specific business objects 112 as requested by a user and/or another application. Business application 118 may be considered a business software or solution that is capable of interacting or integrating with metadata repository 110 located, for example, in memory 106 to provide access to data for personal or business use. An example business application 118 may be a computer application for performing any suitable business process by implementing or executing a plurality of steps. One example of a business application 118 is an application that may provide an aspect of a business process such that information may be dispersed among a plurality of interdependent business objects 112. As a result, business application 118 may provide a method of accessing requested data and presenting it to the user and/or application such that the user and/or application are provided information through a GUI interface 122 in a centralized manner.

More specifically, business application 118 may be a composite application, or an application built on other applications that include an object access layer (OAL) and a service layer. In this example, application 118 may execute or provide a number of application services, such as CRM systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the business applications 118 whether locally or remotely executed. These layers may help application 118 to orchestrate a business process in synchronization with other existing processes (e.g., native processes of enterprise base systems) and leverage existing investments in the IT platform. Further, the different applications 118 may run on heterogeneous IT platforms. In doing so, the business applications 118 may be cross-functional in that it may drive business processes across different applications, technologies, and organizations. Accordingly, the different applications 118 may drive end-to-end business processes across heterogeneous systems or sub-systems. Application 118 may also include or be coupled with a persistence layer and at least one application system connector. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. Regardless, application 118 may also perform processing automatically, which may indicate that the appropriate processing is substantially performed by at least one component of system 100. Any suitable administrator or other user interaction with application 118 or other components of system 100 may be included without departing from its original scope. Finally, the system 100 may utilize or be coupled with various instances of business applications 118. For example, client 104 may run a first business application 118 that is communicably coupled with a second business application 118. Each business application 118 may represent different solutions, versions, or modules available from one or a plurality of software providers or developed in-house.

For example, portions of the business applications 118 may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to server 102, at least one processes associated with applications 118 and/or business application 118 may be stored, referenced, or executed remotely. For example, a portion of application 118 may be a web service that is remotely called, while another portion of application 118 may be an interface object bundled for processing at remote client 104. Moreover, application 118 may be a child or sub-module of another software module or enterprise application (not illustrated) without departing from the scope of this disclosure. Indeed, application 118 may be a hosted solution that allows multiple parties in different portions of the process to perform the respective processing. For example, client 104 may access application 118, once developed, on server 102 or even as a hosted application located over network 105 without departing from the scope of this disclosure. In another example, portions of software applications 118 may be developed by the developer working directly at server 102, as well as remotely at client 104. Regardless of the particular implementation, "software" may include software, firmware, wired or programmed hardware, or any combination thereof as appropriate. Indeed, each of the foregoing software applications may be written or described in any appropriate computer language including C, C++, Java, Visual Basic, assembler, Perl, any suitable version of 4GL, as well as others. It will be understood that while these applications are shown as a single multi-tasked module that implements the various features and functionality through various objects, methods, or other processes, each may instead be a distributed application with multiple sub-modules. Further, while illustrated as internal to server 102, at least one process associated with these applications may be stored, referenced, or executed remotely. Moreover, each of these software applications may be a child or sub-module of another software module or enterprise application (not illustrated) without departing from the scope of this disclosure.

Network 105 facilitates wireless or wireline communication between computer server 102 and any other local or remote computer, such as clients 104. Indeed, while illustrated as a single network 105 may be multiple networks without departing from the scope of this disclosure, so long as at least portion of network 105 may facilitate communications between senders and recipients of requests and results. In other words, network 105 encompasses any internal and/or external network, networks, sub-network, or combination thereof operable to facilitate communications between various computing components in environment 100. Network 105 may communicate, for example, Internet Protocol (IP) packets, Frame Relay frames, Asynchronous Transfer Mode (ATM) cells, voice, video, data, and other suitable information between network addresses. Network 105 may include at least one local area networks (LANs), radio access networks (RANs), metropolitan area networks (MANs), wide area networks (WANs), all or a portion of the global computer network known as the Internet, and/or any other communication system or systems at least one location.

Client 104 is any local or remote computing device operable to receive requests from the user via a user interface 122, such as a GUI, a CLI (Command Line Interface), or any of numerous other user interfaces. Thus, where reference is made to a particular interface, it should be understood that any other user interface may be substituted in its place. In various implementations, each client 104 includes at least GUI 122 and comprises an electronic computing device operable to receive, transmit, process and store any appropriate data associated with system 100. In addition, there may be any number of clients 104 communicably coupled to server 102. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via GUI 122. As used in this disclosure, client 104 is intended to encompass a personal computer, touch screen terminal, workstation, network computer, kiosk, wireless data port, wireless or wireline phone, personal data assistant (PDA), at least one processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 122. Both the input device and output device may include fixed or removable storage media such as a magnetic computer disk, CD-ROM, or other suitable media to both receive input from and provide output to users of clients 104 through the display, namely GUI 122.

GUI 122 comprises a graphical user interface operable to allow the user of client 104 to interface with at least a portion of system 100 for any suitable purpose. Generally, GUI 122 provides the user of client 104 with an efficient and user-friendly presentation of data provided by or communicated within system 100. GUI 122 may provide access to the front-end of business application 118 executing on client 104 that is operable to access at least one business objects 112 stored within metadata repository 110. In another example, GUI 122 may display output reports such as summary and detailed reports. GUI 122 may comprise a plurality of customizable frames or views having interactive fields, pull-down lists, and buttons operated by the user. In one implementation, GUI 122 presents information associated with queries and buttons and receives commands from the user of client 104 via one of the input devices. Moreover, the term graphical user interface may be used in the singular or in the plural to describe at least one graphical user interfaces and each of the displays of a particular graphical user interface. Therefore, GUI 122 contemplates any graphical user interface, such as a generic web browser or touch screen that processes information in system 100 and efficiently presents the results to the user. Server 102 can accept data from client 104 via the web browser (e.g., Microsoft Internet Explorer or Mozilla Firefox) and return the appropriate HTML and/or XML responses using network 105. For example, server 102 may receive a request from client 104 using the web browser and then execute the request to store and/or retrieve information and data from a business object 112 stored within metadata repository 110.

In one aspect of operation, the business application 118a may receive a request to update a sales order from the client 104a. In response to at least the request, the business application 118a may directly update successor business objects 112 with an indication that an update to the sales order is expected. In some implementations, the business application 118a may update the variable 116 using the business application 118b. In either case, the business application 118b may prevent release by, for example, executing a hold or at least preventing finalization and/or release of the successor business document in response to at least the updated variable 116. After receiving the updated information, the business application 118b may directly or indirectly update the corresponding business object 112 including the corresponding variable 116 for the successor business object 112. In some implementations, the business application 118b may present, to a user, a request to either accept or reject the updates to the successor business object 112.

FIG. 2 illustrates an example system 200 for transmitting indications of a potential update between different enterprises 202. For example, the enterprise 202a may be an online retailer while the enterprise 202b may a delivery service. In this case, the computing device 206a may execute business application 118a of FIG. 1 and transmit information (e.g., predecessor document) indicating that a customer has indicated an intention to update a sales order. The information may be transmitted through the network 204 to the enterprise 202b. In response to the information, the computing device 206b may execute the business application 118b to update the variable 116. After receiving the update from the enterprise 202a, the computing device 206b may automatically update the successor business object 112 or present a request to manually accept or reject the updates.

Figure 3:
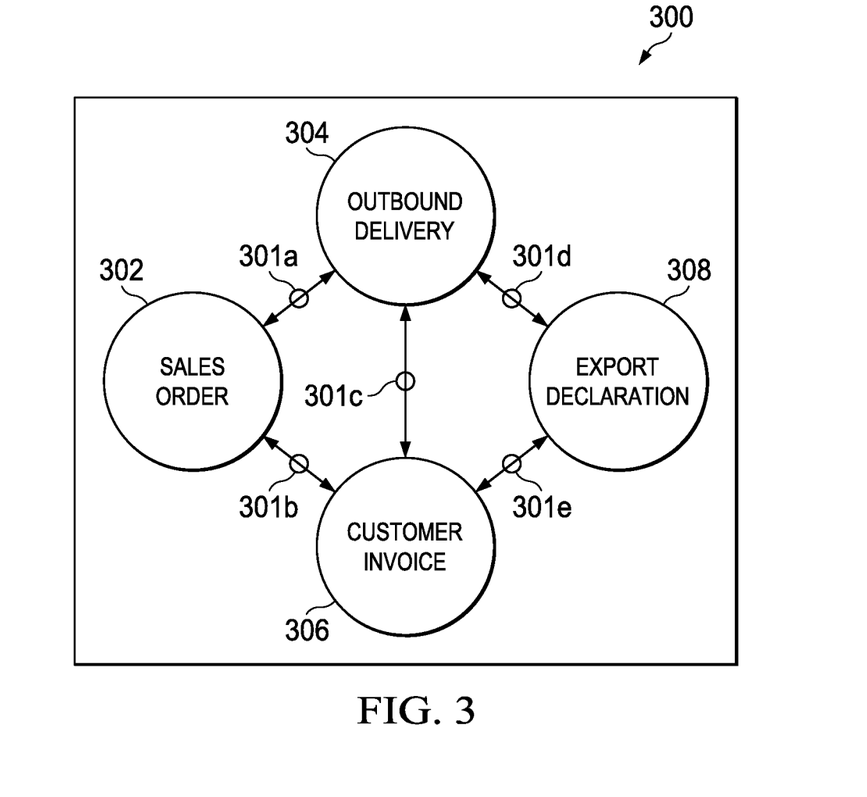
FIG. 3 is a schematic diagram illustrating interdependencies between different documents in a business process.

FIG. 3 is a schematic diagram 300 illustrating interdependencies 301a-c between different documents 302, 304, 306, and 308 in a business process. In particular, the business process includes a sales order 302, an outbound delivery 304, a customer invoice 306 and an export declaration 308. In the illustrated example, the interdependencies 301a-c illustrate that some documents depends on information included in predecessor documents. For example, both the outbound delivery 304 and the customer invoice 306 depend on information included or otherwise identified by the sales order 302. In other words, the generation or update of a business object representing one business document influences in general the business object representing the other business documents within the business process. In these instances, the update of one business object may result in updates of other business objects within a business process such that documents in the process are consistently represented. Turning to the example, an update of the delivered quantity in an outbound delivery 304 may result in an update of the corresponding value in the customer invoice 306, which is illustrated by interdependency 301c. In addition, the quantity, the weight and the value may be updated in the corresponding export declaration 308.

As previously described, the status variable may identify, from a business objects point of view, expected or already received updated information from the associated business process. These status variables may increase transparency to the user regarding activities in the business process and may enable the user to assess the current status of the business process. Based on the increased transparency in the business process, the user may review updated information before approving updates to dependent attributes within a business object. In some implementations, a business object may include several status variables that describe different possible updates and/or update requests caused within the business process. Each variable may describe a different aspect of a business process, which may be defined by another business document, a part of business document or a set of business documents within the business process. For example, variables associated with the export declaration 308 may identify update requests due to changes in the outbound delivery 304, the customer invoice 302, packaging information from within the outbound delivery 304, the sales process reflected in multiple business documents as the sales order 302 and customer invoice 306, and/or others. Continuing with the export declaration 308, after the release of an outbound delivery 304, the export declaration 308 may be generated based, at least in part, on the latest state of the outbound delivery 304. With respect to the outbound delivery 304, all update requests may have been processed completely and further update requests may not be expected (e.g., outbound delivery variable: (Update Request) completed). Since the customer invoice request may not have been released, an update request from the customer invoice 306 may be expected (e.g., customer invoice variable: (Update Request) expected). If the later, an update request from the customer invoice 306 may have been received such that a user may have assess the request and decide on further processing (e.g., customer invoice variable: (Update request) received).

Figure 4:
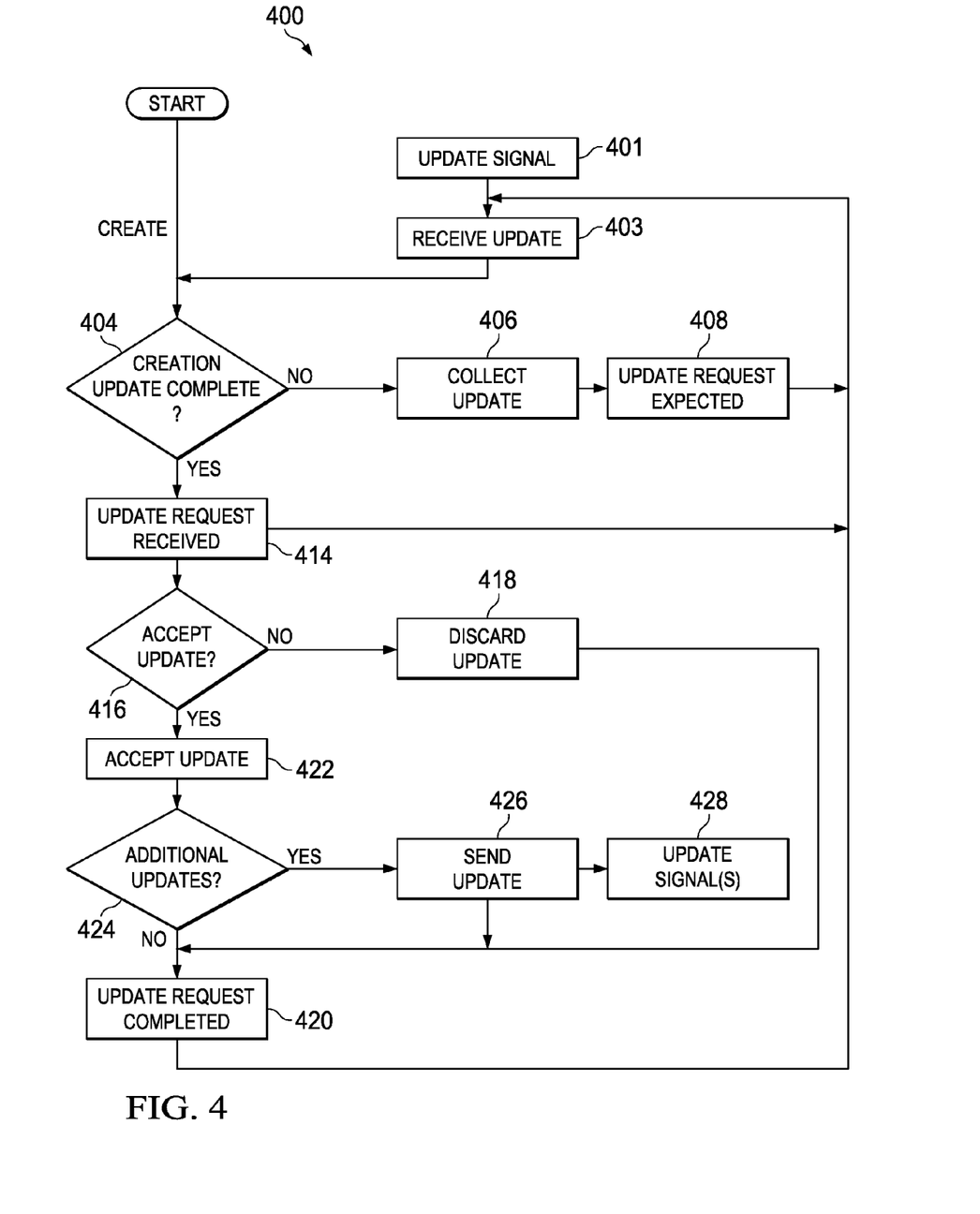
FIG. 4 is a flowchart illustrating an example method for updating variables in business objects based on predecessor documents.

FIG. 4 is a flow chart illustrating an example method 400 for updating variables in business objects based on updates to predecessor documents. In particular, the method 400 illustrates possible values of a status variable after generating a business object for a successor document. Method 400 starts where an update signal identifying an expected update is received. In the event that an update to a business object 112 is expected, the status variable 116 may be update to a status value of, for example, "(Update Request) expected". At step 403, an update is received. For example, the business application 118b may receive information from client 104a identifying a specific update for the business object 112. The variable 116 may be updated to "(Update Request) received" to indicate that a complete set of information has been received. If the update is incomplete at decisional step 404, then, at step 406, the partial update is stored. An updated request is expected at step 408. In the example, the business application 118b updates the corresponding business object 112 with the partial update and updates the variable 116 with a value indicating an update is expected or partially received.

Execution returns to step 403. Returning to decisional step 404, if the update is complete, then, at step 414, the status variable is updated to indicate that the update has been received.

If the received update is not accepted at decisional step 416, then, at step 418, the update is discarded. Execution proceeds to step 420. If the received update is accepted, then the associated business object is updated in accordance with the request at step 422. In some implementations, update requests received during the generation of the business object or after generation the business object may not be separated. The system (e.g., system 100 of FIG. 1) may directly and/or automatically determine if the update request is accepted, and the business-object attributes are updated in accordance with the update request or discarded if the update request is rejected. In other cases, the user may determine whether to accept or reject the identified update. If different business objects depend from the updated business object at decisional step 424, then, at step 426, the update is transmitted to the associated business objects. An update signal is received at step 428. If no additional business objects are affected by the update, then, at step 420, the variable of the business object is updated to identify that the update request is complete. For example, either the automated update or the user-selected updated may lead to the status value "(Update Request) completed" whether accepted or discarded, since the update request has been appropriately processed. In some implementations, the business object content may be different if the update request is discarded and the user updates the business object using a different process. A blank value presented through the user interface (e.g., GUI 122) may identify the "(update request) completed" value in the backend system. Additional update requests may be received at other times even if an additional update request has been expected or if it has already not been decided how to process the previous complete update request. Execution returns to step 403. As illustrated, further updates may be received independent of the current status value. If a new update request is received before determining how to process the previous update request, the update requests may be cumulated to a new complete or incomplete update request. If an update request is accepted and the business object is updated accordingly, the business object may also send update signals to other business objects in the business process.

Figure 5:
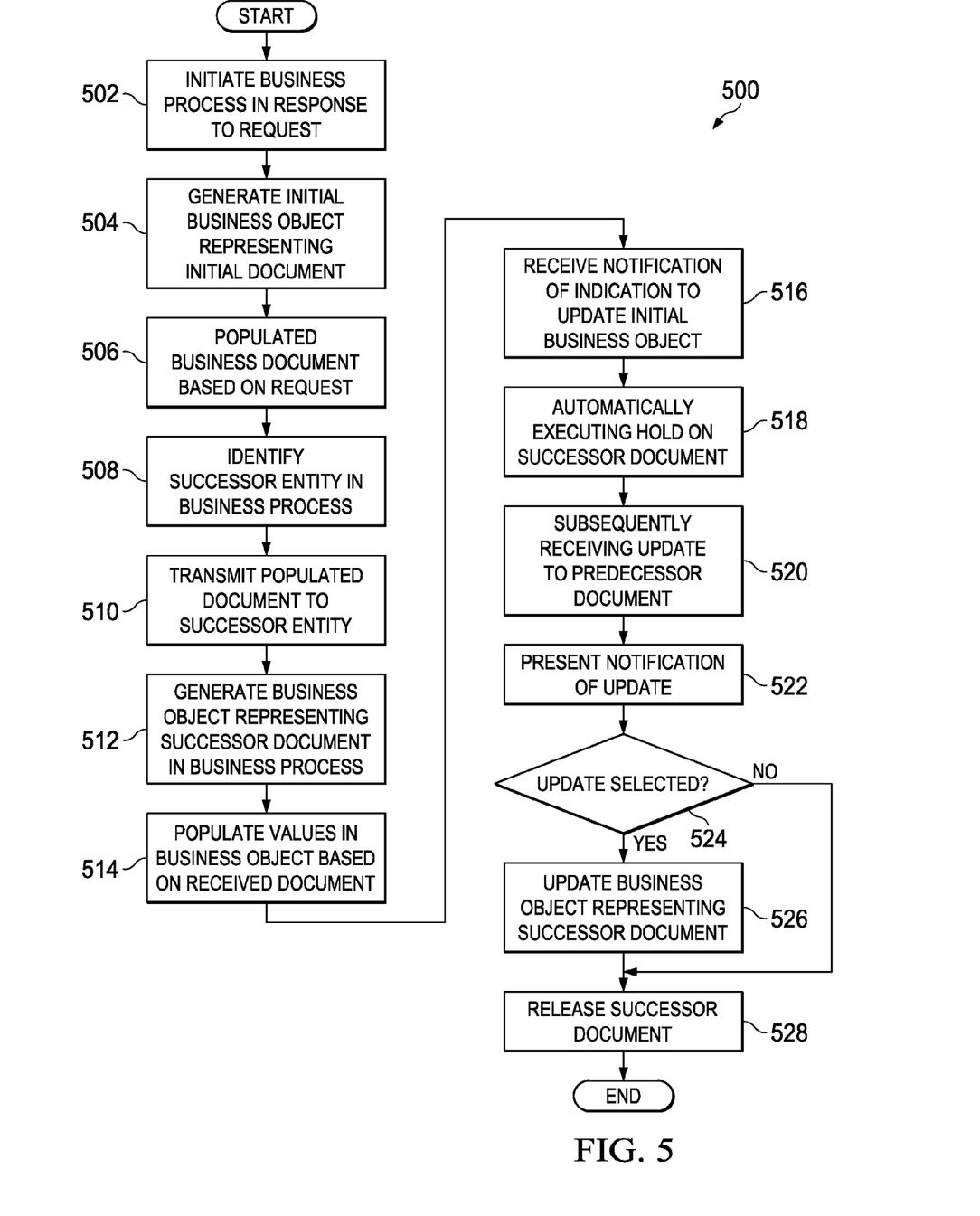
FIG. 5 is a flowchart illustrating an example method for updating interdependent documents in a business process.

FIG. 5 is a flowchart illustrating an example method 500 for updating interdependent documents in a business process. Method 500 is described with respect to system 100 of FIG. 1. Though, system 100 contemplates using or implementing any suitable technique for performing these and other tasks. These methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate.

At a high level, method 500 includes two processes: (1) generating business objects in a business process from step 502 to step 514; and (2) updating a successor document based on changes to a predecessor document from step 516 to step 528. As for the generating process, a business process is initiated at step 502. For example, the business application 118*a* may receive a request to purchase an item from the client 104. At step 504, an initial business object representing the initial document is generated. In the example, the business application 118*a* may generate a business object 112 representing a sales order submitted by the client 104. Next, at step 506, the initial business document may be populated based on the request. As for the example, the business application 118*a* may populate the business object 112 representing the sales order with information at least identified by the request from the client 104. A successor enterprise in the business process is identified at step 508. Again in the example, the business application 118*a* may identify a successor enterprise different from the enterprise processing the sales order such as a website operator identifying an enterprise that may fulfill the order. At step 510, the populated document is transmitted to the successor enterprise. In the example, the application 118*a* may transmit the populated document or at least information identifying data included in the document to a different enterprise as illustrated in FIG. 2. Next, at step 512, a business object representing a successor document in the business process is generated. Returning to the example, the business application 118*b* may identify information included or at least identified in the predecessor business object 112. The successor business object is populated with at least one value based, at least in part, on the information identified by the predecessor document at step 514. As for the example, the business application 118*b* may populate a business object 112 representing a customer invoice with a total number of items ordered, a price for each, and a total cost including tax.

Turning to the updating process, a notification of an indication to update the initial business object is received at step 516. Again in the example, the client 104 may transmit a request to update a sales order to the business application 118*a*. At step 518, a hold is automatically executed on the successor document. In the example, the business application 118*a* may directly place a hold on the successor business object 112 or place a hold on the business object 112 through the business application 118*b*. In either case, the business application 118*b* may be substantially prevented from finalizing and/or releasing the successor business object 118*a* and/or document. Next, at step 520, the update to the predecessor document is subsequently received. As for the example, the business application 118*a* may receive the update to the predecessor business object 112. The notification of the update is presented to the user at step 522. The user of the business application 118*b* may be presented with the update for manual acceptance. If the user selects the update at decisional step 526, then, at step 526, the business object representing the successor document is updated based on the update to the predecessor document. Returning to the example, the business application 118*b* may update the successor business object 112 based, at least in part, on the updates to the predecessor document. If the user rejects the update at decisional 526, then, at step 528, the successor document is released independent of updates.

A number of implementations have been described. Nevertheless, it will be understood that various modifications may be made without departing from the spirit and scope of the disclosure. In some examples, the content of the update may be displayed to the user to inform them about the type of change (e.g., if package data was changed). In some examples, a preview of the receiving business document may be displayed to the user after the acceptance, which may provide an opportunity to determine whether to execute additional rework efforts after the acceptance or the rejection. Furthermore, partial updates may be accepted, for example if the change of the quantity is acceptable, but defaulting of the commodity code should not overwrite the manual changes. Accordingly, other embodiments are within the scope of the following claims.

What is claimed is:

1. A computer-implemented method performed by at least one processor, the method comprising the following operations:
   generating, during a first phase in a business process, a predecessor document based on a request;
   releasing the predecessor document to a second phase in the business process;
   while maintaining the predecessor document, generating, during the second phase in the business process, a successor document based on information included in the predecessor document, wherein the predecessor document and the successor document are separate and different types of documents and are populated at different stages in a business process;
   receiving, from a previous stage in the business process, a notification of a potential update to the predecessor document in the business process prior to receiving a specific update to the predecessor document;
   in response to at least the potential-update notification, identifying the successor document in the business process, wherein the successor document depends on information at least identified by the predecessor document, and the successor document was generated, prior to receiving the notification of the potential update;
   substantially preventing release of the successor document in response to the notification of the potential update to the predecessor document;
   receiving a specific update to the predecessor document from the previous stage in the business process;
   updating the successor document based on the received update; and
   releasing the updated successor document.

2. The method of claim 1, wherein a successor enterprise receives the notification from a predecessor enterprise different from the successor enterprise.

3. The method of claim 1, wherein a corresponding business object represents the successor document, the received notification includes an update to a status variable for the successor document, the method further comprising updating the corresponding business object for the successor document with the update to the status variable, wherein the update to the status variable indicates an update to the predecessor document is expected.

4. The method of claim 1, further comprising presenting, to a user, a notification identifying the specific update to the predecessor document.

5. The method of claim 4, further comprising receiving a selection whether to accept or reject an update to the successor document based on the specific update to the predecessor document.

6. The method of claim 1, further comprising:
   receiving the predecessor document including data associated with the business process; and
   populating the successor document with data based, at least in part, on the data in the predecessor document.

7. The method of claim 1, wherein the successor document comprises a first successor document, further comprising transmitting a notification of an update of the first successor document to an enterprise processing a second successor document, wherein the second successor documents depends on data identified by the first successor document.

8. A computer program product encoded on a non-transitory, tangible storage medium, the product comprising computer readable instructions for causing at least one processor to perform operations comprising:
   generating, during a first phase in a business process, a predecessor document based on a request;
   releasing the predecessor document to a second phase in the business process;
   while maintaining the predecessor document, generating, during the second phase in the business process, a successor document based on information included in the predecessor document, wherein the predecessor document and the successor document are separate and different types of documents and are populated at different stages in a business process;
   receiving, from a previous stage in the business process, a notification of a potential update to the predecessor document in the business process prior to receiving a specific update to the predecessor document;
   in response to at least the potential-update notification, identifying the successor document in the business process, wherein the successor document depends on information at least identified by the predecessor document, and the successor document was generated, prior to receiving the notification of the potential update;
   substantially preventing release of the successor document in response to the notification of the potential update to the predecessor document;
   receiving a specific update to the predecessor document from the previous stage in the business process;
   updating the successor document based on the received update; and
   releasing the updated successor document.

9. The computer program product of claim 8, wherein a successor enterprise receives the notification from a predecessor enterprise different from the successor enterprise.

10. The computer program product of claim 8, wherein a corresponding business object represents the successor document, the received notification includes an update to a status variable for the successor document, the operations further comprising updating the corresponding business object for the successor document with the update to the status variable, wherein the update to the status variable indicates an update to the predecessor document is expected.

11. The computer program product of claim 8, the operations further comprising presenting, to a user, a notification identifying the specific update to the predecessor document.

12. The computer program product of claim 11, the operations further comprising receiving a selection whether to accept or reject an update to the successor document based on the specific update to the predecessor document.

13. The computer program product of claim 8, the operations further comprising:
   receiving the predecessor document including data associated with the business process; and
   populating the successor document with data based, at least in part, on the data in the predecessor document.

14. The computer program product of claim 8, wherein the successor document comprises a first successor document, the operations further comprising transmitting a notification of an update of the first successor document to an enterprise processing a second successor document, wherein the second successor documents depends on data identified by the first successor document.

15. A system comprising:
   memory for storing a set of objects associated with the system; and
   at least one processor operable to:
      generate, during a first phase in a business process, a predecessor document based on a request;

release the predecessor document to a second phase in the business process;

while maintaining the predecessor document, generate, during the second phase in the business process, a successor document based on information included in the predecessor document, wherein the predecessor document and the successor document are separate and different types of documents and are populated at different stages in a business process;

receive, from a previous stage in the business process, a notification of a potential update to the predecessor document in the business process prior to receiving a specific update to the predecessor document;

in response to at least the potential-update notification, identify the successor document in the business process, wherein the successor document depends on information at least identified by the predecessor document, and the successor document was generated, prior to receiving the notification of the potential update;

substantially prevent release of the successor document in response to the notification of the potential update to the predecessor document;

receive a specific update to the predecessor document from the previous stage in the business process;

update the successor document based on the received update; and release the updated successor document.

16. The system of claim 15, wherein a successor enterprise receives the notification from a predecessor enterprise different from the successor enterprise.

17. The system of claim 15, wherein a corresponding business object represents the successor document, the received notification includes an update to a status variable for the predecessor document, the processors further operable to update the corresponding business object for the successor document with the update to the status variable, wherein the update to the status variable indicates an update to the predecessor document is expected.

18. The system of claim 15, the processors further operable to present, to a user, a notification identifying the specific update to the predecessor document.

19. The system of claim 18, the processors further operable to receive a selection whether to accept or reject an update to the successor document based on the specific update to the predecessor document.

20. The system of claim 15, the processors further operable to:

receive the predecessor document including data associated with the business process; and populate the successor document with data based, at least in part, on the data in the predecessor document.

21. The system of claim 15, wherein the successor document comprises a first successor document, the processors further operable to transmitting a notification of an update of the first successor document to an enterprise processing a second successor document, wherein the second successor documents depends on data identified by the first successor document.

* * * * *